United States Patent Office.

ADOLF BAEYER, OF MUNICH, GERMANY.

MANUFACTURE OF ARTIFICIAL INDIGO.

SPECIFICATION forming part of Letters Patent No. 233,458, dated October 19, 1880.

Application filed April 6, 1880. (Specimens.)

*To all whom it may concern:*

Be it known that I, ADOLF BAEYER, doctor of philosophy and professor of chemistry in the University of Munich, in the Empire of Germany, have invented a new and useful Improvement relating to Materials used in the Manufacture of Artificial Indigo, which improvement is fully set forth in the following specification.

This invention relates to the synthetical formation of indigo-blue and allied coloring-matters, and to the production of materials used in the preparation of the same. The said materials are derivatives of orthonitrocinnamic acid, and more particularly the orthonitro substitution compounds of dibromohydrocinnamic acid, of phenyloxyacrylic acid, of phenylpropiolic acid, and analogous substances.

According to this invention the above materials are prepared by submitting orthonitrocinnamic acid, or any mixture or compound containing the same, to a treatment analogous to that by which cinnamic acid may be converted into dibromohydrocinnamic acid, or into phenyloxyacrylic acid, or into phenylpropiolic acid, or into analogous substances, as is well understood by chemists.

In carrying out my invention I convert orthonitrocinnamic acid into its dibrominated compound, which in chemical language may be called "orthonitrodibromohydrocinnamic acid," by direct treatment with liquid or gaseous bromine at an ordinary or at an elevated temperature, with or without the presence of suitable solvents. For instance, one molecule of orthonitrocinnamic acid, previously dried and pulverized, is intimately mixed with two or more molecules of liquid bromine, and the mixture is allowed to stand at an ordinary temperature during several hours, or until the bromine has become absorbed, or nearly so. The resulting product may then be further purified by crystallization from benzole or other suitable solvents.

In its purified state dibrominated orthonitrocinnamic acid is a white or yellowish-white crystalline solid body, easily soluble in alcohol, ether, chloroform, benzole, and glacial acetic acid, and insoluble in the petroleum hydrocarbons. It is a strong acid, and forms salts with alkalies and salifiable bases. Its most characteristic properties are the following: It is decomposed by heat, and among the products of decomposition hydrobromic acid and indigo-blue may be discerned. Treated with an excess of alkali in aqueous or alcoholic solutions and at an elevated temperature its bromine is gradually eliminated.

The final action of alkalies in alcoholic solution results in the formation of orthonitrophenylpropiolic acid, the presence of which may be readily ascertained by its characteristic property of becoming changed into indigo-blue upon being gently heated with a mixture of alkaline substances and of deoxidizing agents— such, for instance, as glucose or milk-sugar.

Dibrominated compounds analogous to orthonitrodibromohydrocinnamic acid may be obtained by employing in the above-described process the homologues and substitution products of orthonitrocinnamic acid—such, for instance, as orthonitroparachlorocinnamic acid.

The dibrominated compound of orthonitrocinnamic acid is used in the manufacture of artificial indigo.

What I claim as new, and desire to secure by Letters Patent, is—

1. As a new article of manufacture, the dibrominated compound of orthonitrocinnamic acid (which compound is termed in chemical language "orthonitrodibromohydrocinnamic acid") produced, substantially as herein described, by the action of liquid bromine on orthonitrocinnamic acid, or by any other means which will produce a like result.

2. The within-described process of producing the dibrominated compound of orthonitrocinnamic acid, by exposing orthonitrocinnamic acid to the action of bromine, substantially as set forth.

In testimony that I claim the foregoing I have hereunto set my hand and seal this 24th day of March, 1880.

ADOLF BAEYER. [L. S.]

Witnesses:
HEINRICH CARO,
GUSTAV SIEGLE.